United States Patent [19]
Wilt

[11] 3,811,221
[45] May 21, 1974

[54] WILD FOWL DECOY DEVICE

[76] Inventor: John E. Wilt, 825 Green Hill Rd., West Chester, Pa. 19380

[22] Filed: Feb. 2, 1973

[21] Appl. No.: 329,039

[52] U.S. Cl. .............................................. 46/180
[51] Int. Cl. ............................................ A63h 5/00
[58] Field of Search ..................................... 46/180

[56] References Cited
UNITED STATES PATENTS

| | | | |
|---|---|---|---|
| 2,969,611 | 1/1961 | Warren | 46/180 |
| 2,833,086 | 5/1958 | Johenning | 46/180 |
| 2,560,895 | 7/1951 | Roth | 46/180 |
| 3,722,133 | 3/1973 | Morgan | 46/180 |

Primary Examiner—Antonio F. Guida
Assistant Examiner—Robert F. Cutting
Attorney, Agent, or Firm—Philip D. Freedman

[57] ABSTRACT

An improved wild fowl decoy device comprises a hollow tube having a transverse opening at one end and an opening remote therefrom for the free escape of air passing through the tube from the said one end, a wall extending across the transverse opening and having a substantially straight free edge substantially bisecting the opening, the wall covering approximately one-half of the opening, and an elastic member mounted under tension across the other approximately one-half of the opening not covered by said wall, the member having a substantially straight free edge extending substantially parallel to the free edge of the wall and approximately bisecting the opening whereby the free edge of the wall approaches but does not overlap the free edge of the elastic member, permitting the latter to flex inwardly and outwardly of said opening. This decoy device may be also characterized by a pair of concentric rings used to retain the elastic member under proper tension, so that when activated a sound is emitted, imitative of the call of a wild fowl.

3 Claims, 3 Drawing Figures

PATENTED MAY 21 1974 3,811,221

WILD FOWL DECOY DEVICE

This invention relates to a sound producing device usable as a game call. Such device may be used in the stalking and bagging of game and the device of this invention finds particular utility for attracting game, particularly turkeys, by emitting a sound simulating the call of the game.

FIG. 1 of the drawings is a prospective illustrating one application of the invention;

Figure 1:
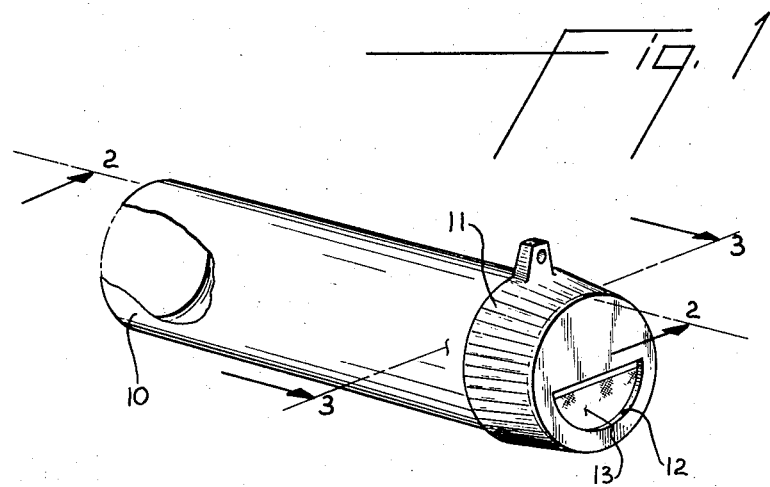
Figure 3:
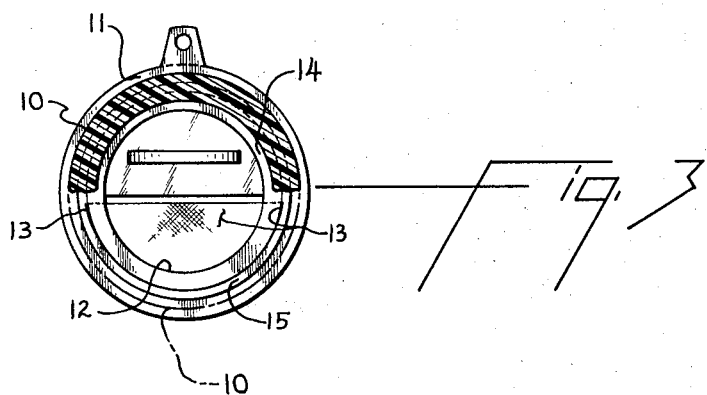
FIG. 3 is a section on line 3—3 of FIG. 1.
Figure 2:
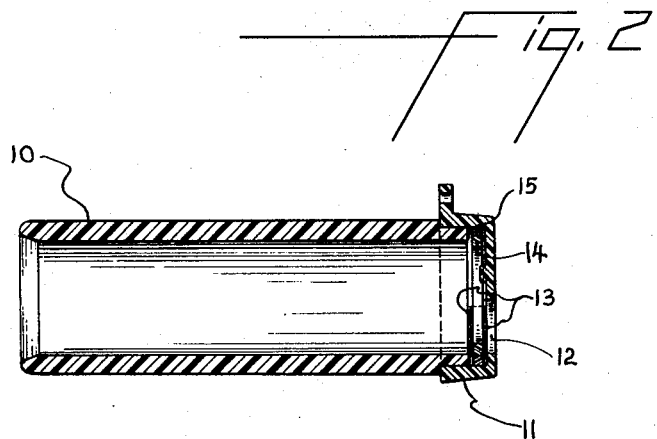
FIG. 2 is a section on line 2—2 of FIG. 1.

The present device is characterized by a flexible elastic member which is set into vibration by the passage of air to create a desired sound. Game call devices known in the art have also utilized a vibrating flexible membrane. Thus, Megginson, U.S. Pat. No. 2,527,756, discloses a turkey caller having a rubber reed member stretched over an opening in a sounding disc plate. The reed is held in place by a split ring member which engages an annular groove in the disc. Roth, U.S. Pat. No. 2,560,895, teaches a whistle structure which includes the use of a resilient and resonant strip that is stretched across an opening in an inner mouthpiece member and which is placed within an opening of an outer member. Gordan, et al., U.S. Pat. No. 2,700,316, shows a sound producing device having a dual chamber diaphragm resonator, and Johenning, U.S. Pat. No. 2,833,086, relates to a turkey caller that is of a box-like construction having a rectangular shaped chamber open at one end, a sound anvil disposed across the open end of the chamber and a flexible diaphragm extending across the chamber's open end.

The Johenning patent is further of interest for its discussion of requirements of a satisfactory call device. As is pointed out there, such devices must be light and compact, yet sturdy. They must be reliable in operation under all extremes of weather conditions, and they must be simple to operate, able to reliably reproduce the particular sound desired and yet capable of being operated in such a manner so that the sound emitted can be varied, modulated, etc.

The devices used in the art generally are of two different types. They may be of the box type or of the mouth operated type. The mouth operated type may utilize either a reed construction or a resonating flexible diaphragm structure. A significant problem with devices having flexible elastic members has been the difficulty of determining the proper tension on the membrane to most accurately imitate the call of the wild fowl. An additional problem has been, once having determined this tension, to reproduce it among a commercial number of such devices. The present invention provides a sound producing device usable as a game call wherein emission of a desired sound is produced by the vibration of a flexible elastic member. The present invention is particularly advantageous in that, by means of a technique to be described, a device is produced wherein the elastic member is precisely stretched so that when activated a sound is emitted that simulates the call of game, particularly wild turkeys. The sound emitted by the device of this invention corresponds to the actual call of the wild turkey to a greater degree than has heretofore been possible with devices of the prior art. Moreover, the device of the present invention can be manufactured in large quantities with the advantage that the same precise tension can be imposed upon the flexible member of each and every device thereby making possible the producing of a large number of calls having the same sound emitting characteristics.

Warren, U.S. Pat. No. 2,969,611 shows a turkey caller comprising a hollow tube having a transverse opening at one end and an opening remote therefrom for the free escape of air passing through the tube from the said one end, a wall extending across the transverse opening and having a substantially straight free edge substantially bisecting the opening, the wall covering approximately one-half of the opening, and an elastic member mounted under tension across the other approximately one-half of the opening not covered by the wall, the member having a substantially straight free edge extending substantially parallel to the free edge of the wall and slightly there beneath and approximately bisecting the opening, whereby the free edge of the wall overlaps the free edge of the elastic member permitting the latter to flex inwardly of the opening.

The present invention relates to an improved device as compared to that of the Warren reference. Firstly, it has been found that, contrary to the teachings of this patent, a sound emitting device that will best imitate the call of a turkey should be characterized by an elastic member that has a free edge that can flex both inwardly and outwardly of its covered opening. Thus, the free edge of the wall across the transverse opening of the tube of the device of the present invention approaches, but does not overlap, the free edge of the elastic member.

The device of the present invention is further characterized in that the elastic member is mounted under tension across the opening of the tube by means of a pair of concentric rings fitted within the tube of the device, preferably within a cap fitted onto one end of the tube. In manufacture the elastic member is placed across the opening of either of the rings of the pair, overlapping the ring, and the second ring of the pair is fitted down on top of the first ring and elastic member, so that the member is placed under tension across the rings and is held there by means of the fit of rings within one another. The combination of the concentric rings and flexible member will be described in more detail below with reference to the drawings.

It has been found that the sound emitted by the device of this invention is a function of the tension across the surface of the flexible member. When the member is under the proper tension, the flow of air across and around the member causes it to vibrate and to emit sound much in the same way a drum head produces sound. It has further been found with the device of the present invention that the tension across the flexible member is a function of the type of material used for the member, the difference between the outside diameter of the inside ring and the inside diameter of the outside ring and the thickness of the rings. It appears that, as the rings are fitted within each other, the flexible member is drawn to a particular tension by the friction of the interaction of the opposing faces of the rings. It further appears that this interaction is affected both by thickness of the rings in that the thicker the rings the longer the length of time or period of draw in which the flexible member is subjected to increasing tension, and by the space between the opposing faces of the rings in that the closer the opposing faces the greater the friction throughout the period of the draw and subsequently the greater the resulting tension on the member.

It has been further found that the sound emitted by the device is further a function of the area of its free, inward and outward flex. In other words, the sound produced is profoundly influenced by change in the surface area of the free flexible action. In applying this principle to the device of this invention it has been found that the sound produced is substantially changed by changes in the inside diameter of the inner ring of the ring pairs.

The wild fowl decoy device of the present invention can be described as comprising a hollow tube having a transverse opening at one end and an opening remote therefrom for the free escape of air passing through the tube from the one end, a wall extending across the transverse opening and having a substantially straight free edge substantially bisecting the opening, the wall covering approximately one-half the opening, and an elastic member mounted under tension across the other approximately one-half of the opening not covered by the wall, the member having a substantially straight free edge extending substantially parallel to the free edge of the wall and approximately bisecting the opening whereby the free edge of the wall approaches but does not overlap the free edge of the elastic member permitting the latter to flex inwardly and outwardly of the opening. The device of the present invention may be further characterized as comprising a disc-shaped cap fitted to the end of the tube and having a transverse opening covering approximately one-half of the head of the cap to form the said wall of the device as described above; a pair of concentric rings fitted within the cap and against the end of the tube; the device further characterized in that the elastic member is mounted under tension across the said opening by means of the concentric rings.

In this invention it is preferred that the tube, cap and concentric rings be of poly (vinyl cloride), (PVC), and that the flexible member be of a rubber latex material. However, other materials and combinations thereof are suitable. Thus the tube, cap and/or concentric circles may be polystyrene, polypropylene, or any rigid plastic, and the flexible material may be latex rubber or neoprene rubber with similar resonant characteristics.

In the present invention it has been found that an excellent wild turkey call device can be produced utilizing a flexible rubber latex material and the concentric rings of the present invention of a thickness of between 0.057 and 0.067, preferably about 0.062, having an inside ring having an inside diameter of between 0.760 and 0.770, preferably about 0.765, and wherein the difference between the outside diameter of the inside ring and the inside diameter of the outside ring is between 0.010 and 0.015 inches, preferably about 0.012 inches. Another excellent device may use a rubber latex material and concentric rings of a thickness of between 0.063 and 0.067 preferably 0.065 inches; an inside ring having an inside diameter of between 0.760 and 0.770, preferably 0.765, inches and wherein the difference between the outside diameter of the inside ring and the inside diameter of the outside ring is between 0.009 and 0.011 inches, preferably about 0.010 inches. These ranges of dimensions result in a flexible material-concentric ring combination that can be successfully used in a wild fowl call device to imitate the call of the wild turkey.

It should be noted that the ranges given for the ring thicknesses, inside diameter of the inside ring and the diameter ratios are exemplary only and that other dimensions would be found suitable with combinations of flexible materials other than rubber latex, with rings constructed of a material other than PVC and with varying ring dimensions. Any combination of these variables is suitable in the present invention so long as the wild call device is characterized by a flexible member that is free to vibrate both inwardly and outwardly of the device opening, and is characterized by the concentric ring construction described above.

Other objects and advantages of the invention will be apparent from the drawings and the description as follows:

Briefly stated, the device of the present invention may comprise a small tube having open ends, a cap and the concentric ring structure holding an elastic membrane adapted to be fitted within the cap and against the top of the tube. The top of the cap has an opening approximately the shape of a semi circle through which air can be forced against the exposed membrane and into the cylinder causing the flexible membrane member to vibrate and to emit sound.

With specific reference to the drawing, the turkey caller comprises a cylinder or tube 10 of PVC or other material with a cap 11 adapted to fit over the end of the cylinder 10. The cap is provided with an opening 12 and a membrane of relatively thin elastic material, preferably latex rubber 13, secured within the cap 11 and against the top opening 12 of the tube 10 and held by a concentric ring structure, ring 14 and ring 15. It should be noted that in this invention the elastic material does not overlap the edge of the opening so that when it is activated by blowing thereon it can vibrate both inwardly and outwardly of the opening.

It should be apparent to those skilled in the art that variations can be made to the decoy device without going beyond the scope of this invention. Thus, the device can be fitted with a mouthpiece or the cap can be provided with a flange to facilitate the removal thereof.

What is claimed is:

1. A wild fowl decoy device comprising a hollow tube having a transverse opening at one end and an opening remote therefrom for the free escape of air passing through the tube from the said one end, a disc-shaped cap fitted to the end of said tube and having a transverse opening covering approximately one-half of the head of said cap, a wall extending across the transverse opening and having a substantially straight free edge substantially bisecting said cap opening, said wall covering approximately one-half of the cap opening, a pair of concentric rings fitted within said cap and against the end of said tube, and an elastic member mounted under tension by means of said concentric rings and across the other approximately one-half of the cap opening not covered by the said wall, the membrane having a substantially straight free edge extending substantially parallel to the free edge of the wall and approximately bisecting said cap opening whereby the free edge of said wall approaches but does not overlap the free edge of the said elastic member, permitting the latter to flex inwardly and outwardly of said cap opening, the said concentric rings further characterized as being of a thickness of between 0.057 and 0.067 inches, the inside ring having an inside diameter of 0.760 and 0.770 inches, and the difference between the outside diameter of the inside ring and the inside diameter of the outside ring being between 0.010 and 0.015 inches.

2. The device of claim 1, wherein the said elastic member comprises a flexible rubber latex material and the said concentric rings are of a PVC material.

3. The device of claim 2, wherein the concentric rings are of a thickness of about 0.062 inches; the inside ring having an inside diameter of about 0.765 inches; and the difference between the outside diameter of the inside ring and the inside diameter of the outside ring is about 0.012 inches.

* * * * *